(12) United States Patent
Kwong et al.

(10) Patent No.: US 9,395,575 B2
(45) Date of Patent: Jul. 19, 2016

(54) DISPLAY FOR ELECTRONIC DEVICE

(71) Applicant: Intel Corporation, Santa Clara, CA (US)

(72) Inventors: Wah Yiu Kwong, Beaverton, OR (US); Hong W. Wong, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 181 days.

(21) Appl. No.: 13/710,740

(22) Filed: Dec. 11, 2012

(65) Prior Publication Data
US 2014/0160365 A1 Jun. 12, 2014

(51) Int. Cl.
*G02F 1/1335* (2006.01)
*G09G 3/36* (2006.01)
*G02F 1/1333* (2006.01)

(52) U.S. Cl.
CPC ............. *G02F 1/1336* (2013.01); *G09G 3/36* (2013.01); *G02F 1/13338* (2013.01); *G02F 2001/133342* (2013.01); *G09G 2300/023* (2013.01); *G09G 2360/04* (2013.01)

(58) Field of Classification Search
CPC ............................... G02F 1/13; G02F 1/13338
USPC ............................................. 345/1.1, 102, 173
See application file for complete search history.

(56) References Cited

U.S. PATENT DOCUMENTS

| 2003/0112217 A1* | 6/2003 | Lee ................................ 345/102 |
| 2007/0052857 A1 | 3/2007 | Song | |
| 2007/0097504 A1* | 5/2007 | Li et al. .......................... 359/494 |
| 2008/0150907 A1* | 6/2008 | Park et al. ...................... 345/173 |
| 2012/0105306 A1* | 5/2012 | Fleck ............................. 345/1.1 |

FOREIGN PATENT DOCUMENTS

| CN | 102214415 A | 10/2011 |
| CN | 104769659 A | 7/2015 |
| JP | 2000-242246 A | 9/2000 |
| JP | 2007-213858 A | 8/2007 |
| JP | 2011-158703 A | 8/2011 |
| JP | 2013-546045 A | 12/2013 |
| KR | 10-2002-0071570 A | 9/2002 |
| KR | 1020020071570 | * 9/2002 |
| KR | 10-2007-0083035 A | 8/2007 |
| KR | 10-2010-0044627 A | 4/2010 |
| TW | 200717103 A | 5/2007 |
| TW | 200831997 A | 8/2008 |

(Continued)

OTHER PUBLICATIONS

International Search Report and Written Opinion for PCT Patent Application No. PCT/US2013/47346, mailed on Sep. 27, 2013, 14 pages.

(Continued)

*Primary Examiner* — Viet Pham
(74) *Attorney, Agent, or Firm* — Alpine Technology Law Group LLC

(57) ABSTRACT

In one embodiment a display assembly comprises a backlight assembly, a first display panel proximate a first side of the backlight assembly, wherein the first liquid crystal panel is to be communicatively coupled to a controller, and a second display panel proximate a second side of the backlight assembly, opposite the first side, wherein the second display panel is to be communicatively coupled to the controller. Other embodiments may be described.

20 Claims, 7 Drawing Sheets

(56) References Cited

FOREIGN PATENT DOCUMENTS

| WO | 2008/020686 | A1 | 2/2008 |
| WO | 2012/044755 | A2 | 4/2012 |
| WO | 2014092783 | A1 | 6/2014 |

OTHER PUBLICATIONS

Search Report received for Taiwanese Patent Application No. 102140131, mailed on Mar. 17, 2015, 9 pages, including 1 page of English translation.

International Preliminary Report of Patentability received for International Application No. PCT/US2013/047346, mailed on Jun. 25, 2015, 11 pages.

Notice of Allowance received for Taiwanese Patent Application No. 102140131, mailed on Nov. 26, 2015, 3 pages including 1 page of English translation.

Extended European Search Report received for European Patent Application No. 13862273.3, mailed on Apr. 6, 2016, 10 pages.

Office Action Received for Japanese Patent Application No. 2015-543035, mailed on May 24, 2016, 5 pages including 2 pages of English Translation.

\* cited by examiner

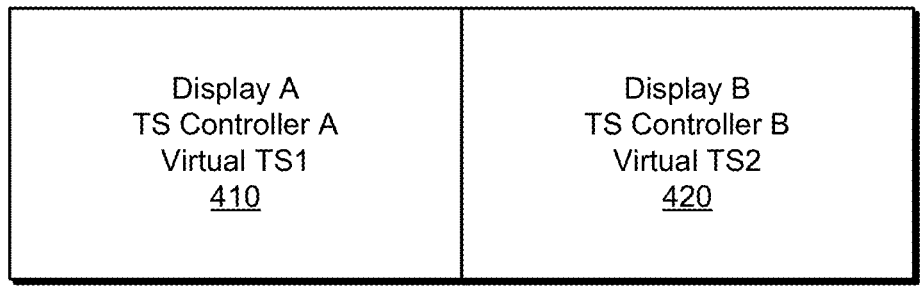
FIG. 4A
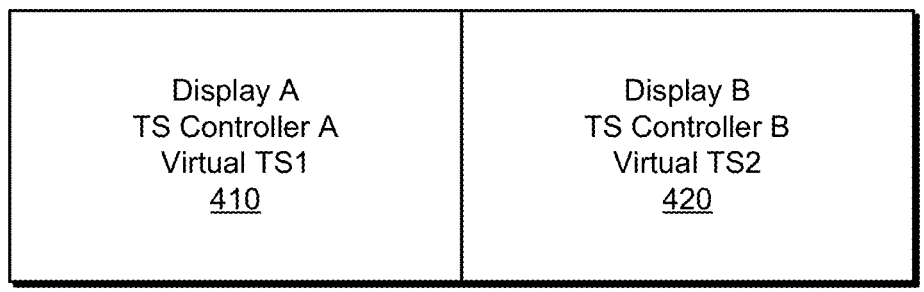
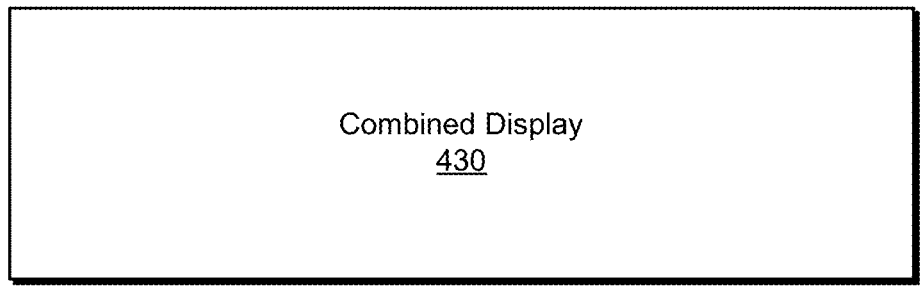
FIG. 4B

Input Conversion

Output Conversion

DISPLAY FOR ELECTRONIC DEVICE

RELATED APPLICATIONS

None.

BACKGROUND

The subject matter described herein relates generally to the field of electronic devices and more particularly to a display assembly for electronic devices.

Electronic devices such as, e.g., laptop computers, notebook computers, tablet computers, and the like have traditionally had a single display. In some situations it may be useful for an electronic device to include two displays accordingly display assemblies for electronic commerce may find utility.

BRIEF DESCRIPTION OF THE DRAWINGS

The detailed description is described with reference to the accompanying figures.

FIGS. 4A-4B and 5 are schematic illustrations of architectures for displays in accordance with some embodiments.

DETAILED DESCRIPTION

Described herein are exemplary systems and methods to implement displays in electronic devices. In some embodiments described herein first and second liquid crystal display (LCD) panels are configured to share a common backlight assembly and a single display controller. The display controller maps inputs from and outputs to the second LCD panel onto a virtual extended LCD panel, such that the second LCD panel is presented as an extension of the first LCD panel to other components of the electronic device. This enables a low-cost dual display assembly to be integrated into electronic devices without modifications to other components of the electronic devices.

In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1:
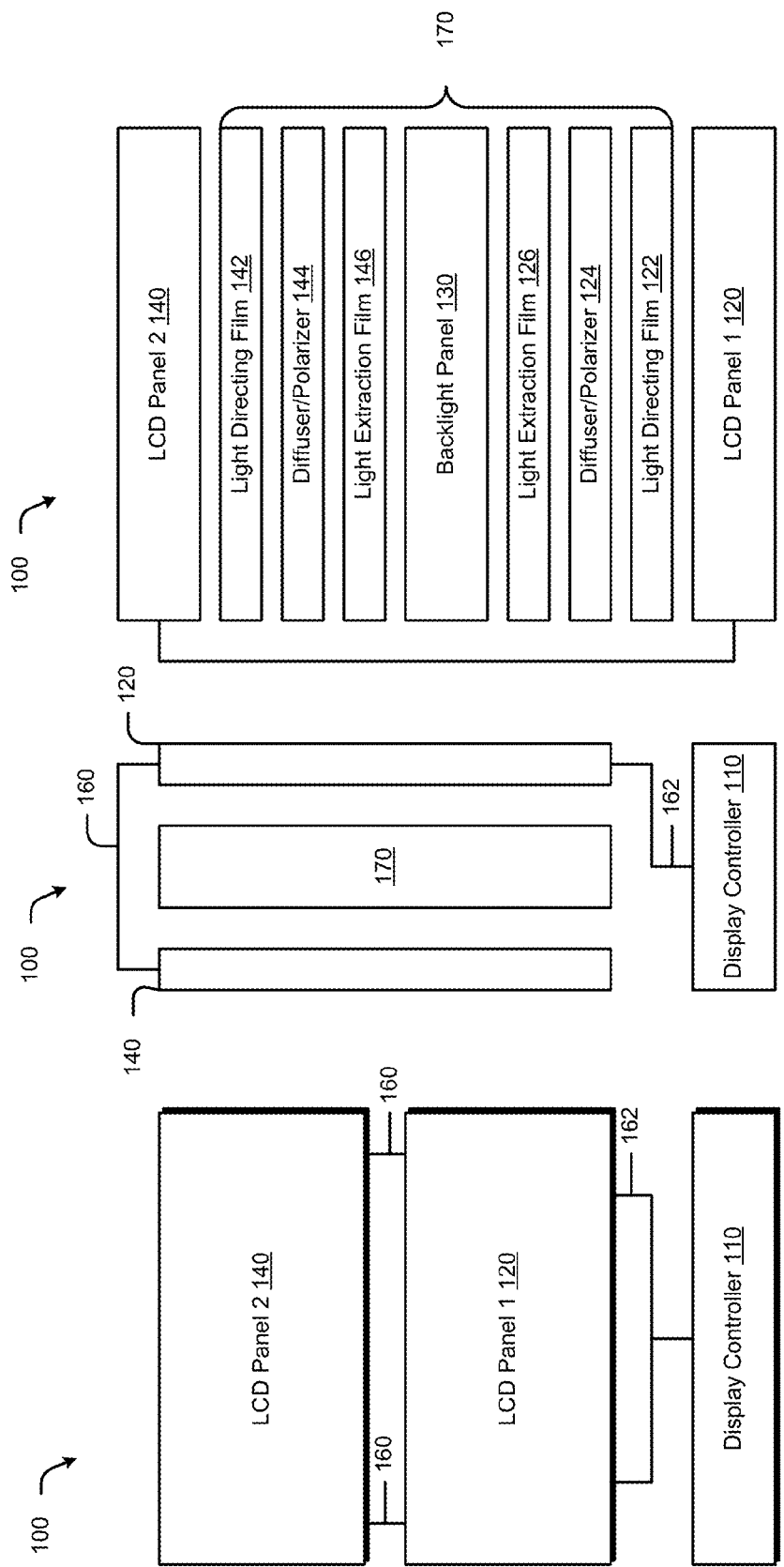
FIGS. 1A-1C are schematic illustrations of an exemplary backlight assembly for electronic devices in accordance with some embodiments.

FIGS. 1A-1C are schematic illustrations of an exemplary backlight assembly for electronic devices in accordance with some embodiments. Referring to FIGS. 1A-1C, in some embodiments a display assembly 100 comprises a display controller 110, a first LCD panel 120 and a second LCD panel 140. The first LCD panel 120 is communicatively coupled to the display controller 110 via a suitable communication bus 162.

The second LCD panel 140 is also coupled to the display controller 110. In some embodiments the second LCD panel 140 may be coupled to the display controller 110 via a communication connection with the first LCD panel 120. By way of example, in some embodiments the second LCD panel may be connected to the first LCD panel by one or more flexible ribbon cables 160.

As illustrated in FIG. 1B, in some embodiments the first LCD panel 120 and the second LCD panel 140 may be positioned proximate a first side of a backlight assembly 170 and the second LCD panel 140 may be positioned proximate a second side of the backlight assembly 170, such that the first LCD panel 120 and the second LCD panel 140 share the backlight assembly 170. In the embodiment depicted in FIG. 1B the second LCD panel 140 is communicatively connected to the display controller 140 via the first LCD panel 120 provided by ribbon cable(s) 160. In alternate embodiments the second LCD panel 140 may have a direct communication connection to display controller 110 via a suitable communication bus.

FIG. 1C is a schematic view of backlight assembly 170, according to some embodiments. Referring to FIG. 1C, backlight assembly may comprise a backlight panel 130. A light extraction layer 126, a diffuser 124 and a light directing layer 122 is disposed proximate a first side of the backlight panel 130. Similarly, a light extraction layer 146, a diffuser 144 and a light directing layer 142 is disposed proximate a second side of the backlight panel 130. In some embodiments, diffuser 144 may also act as a polarizer to polarize light emitted by light-emitting diodes (LEDs) in the backlight assembly.

A first LCD panel 120 is positioned adjacent light directing layer 122 and a second LCD panel 140 is positioned adjacent light directing layer 142. In some embodiments, LCD panel may be a twisted nematic LCD, an in-plane switching LCD, or a vertical alignment (VA) LCD and may comprise other components for the display image formation such as TFT backplane, polarizer, analyzer, color filter array, etc. In alternate embodiments the display may comprise an OLED display, which does not require a backlight.

Figure 2:
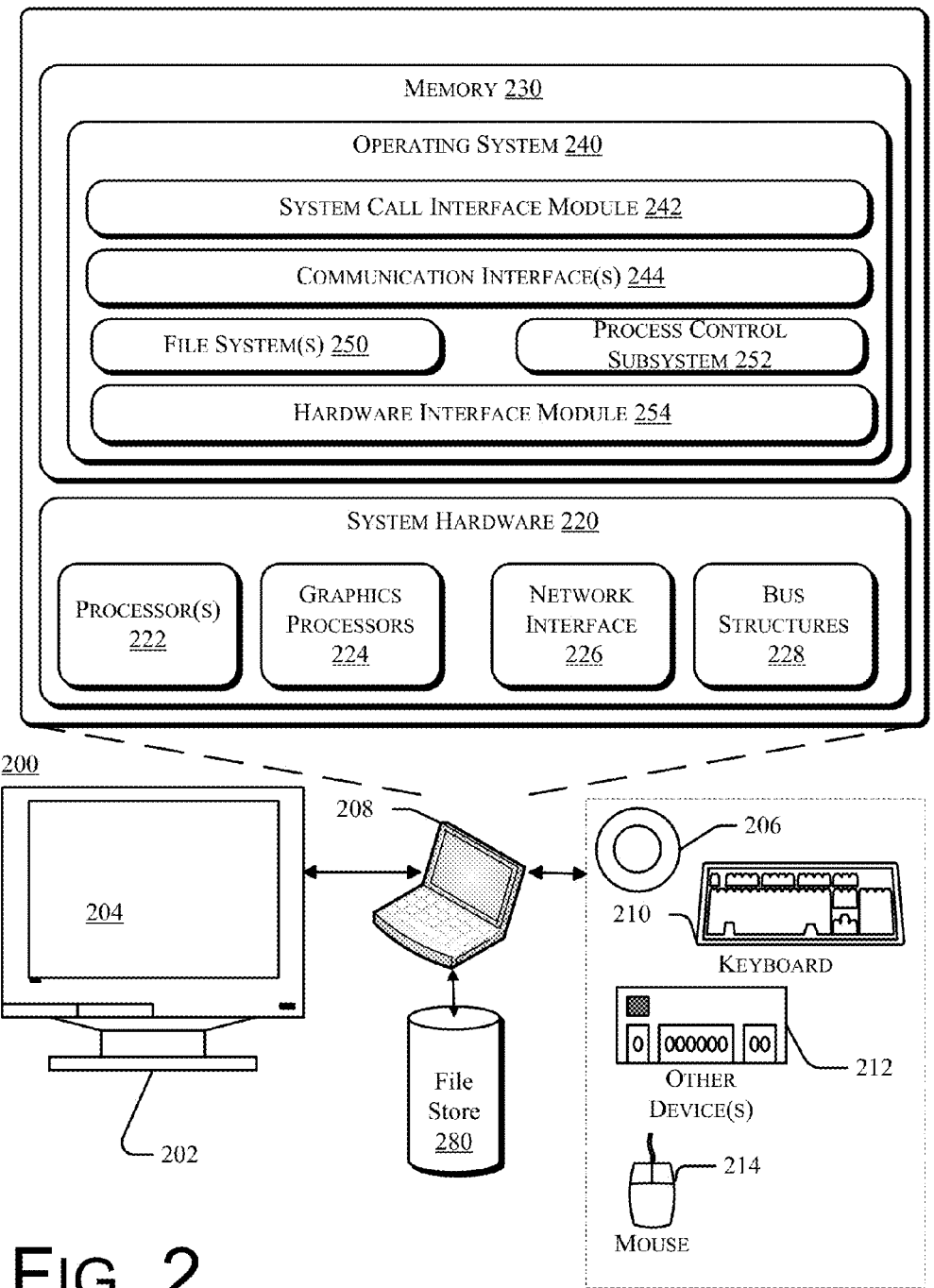
FIGS. 2 and 3 are high-level schematic illustrations of electronic device which may be adapted to include displays in accordance with some embodiments.

FIG. 2 is a schematic illustration of an exemplary system which may be adapted to include a backlight assembly as described herein, in accordance with some embodiments. In one embodiment, system 200 includes an electronic device 208 and one or more accompanying input/output devices including a display 202 having a screen 204, one or more speakers 206, a keyboard 210, one or more other I/O device(s) 212, and a mouse 214. The other I/O device(s) 212 may include a touch screen, a voice-activated input device, a track ball, and any other device that allows the system 200 to receive input from a user.

In various embodiments, the electronic device 208 may be embodied as a personal computer, a laptop computer, a personal digital assistant, a mobile telephone, an entertainment device, or another computing device. In one embodiment, the computing device further comprises a housing having a lid 207.

The electronic device 208 includes system hardware 220 and memory 230, which may be implemented as random access memory and/or read-only memory. A file store 280 may be communicatively coupled to computing device 208. File store 280 may be internal to electronic device 208 such as, e.g., one or more hard drives, CD-ROM drives, DVD-ROM drives, or other types of storage devices. File store 280 may also be external to electronic device 208 such as, e.g., one or more external hard drives, network attached storage, or a separate storage network.

System hardware 220 may include one or more processors 222, at least two graphics processors 224, network interfaces 226, and bus structures 228. In one embodiment, processor 222 may be embodied as an Intel® Core2 Duo® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

In some embodiments one of the processors 222 in system hardware 220 may comprise a low-power embedded processor, referred to herein as a manageability engine (ME). The manageability engine 222 may be implemented as an independent integrated circuit or may be a dedicated portion of a larger processor 222.

Graphics processor(s) 224 may function as adjunct processor that manages graphics and/or video operations. Graphics processor(s) 224 may be integrated onto the motherboard of electronic device 208 or may be coupled via an expansion slot on the motherboard.

In one embodiment, network interface 226 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11 G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 228 connect various components of system hardware 228. In one embodiment, bus structures 228 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 230 may include an operating system 240 for managing operations of electronic device 208. In one embodiment, operating system 240 includes a hardware interface module 254 that provides an interface to system hardware 220. In addition, operating system 240 may include a file system 250 that manages files used in the operation of computing device 208 and a process control subsystem 252 that manages processes executing on electronic device 208.

Operating system 240 may include (or manage) one or more communication interfaces that may operate in conjunction with system hardware 220 to transceive data packets and/or data streams from a remote source. Operating system 240 may further include a system call interface module 242 that provides an interface between the operating system 240 and one or more application modules resident in memory 230. Operating system 240 may be embodied as a UNIX operating system or any derivative thereof (e.g., Linux, Solaris, etc.) or as a Windows® brand operating system, or other operating systems.

Figure 3:
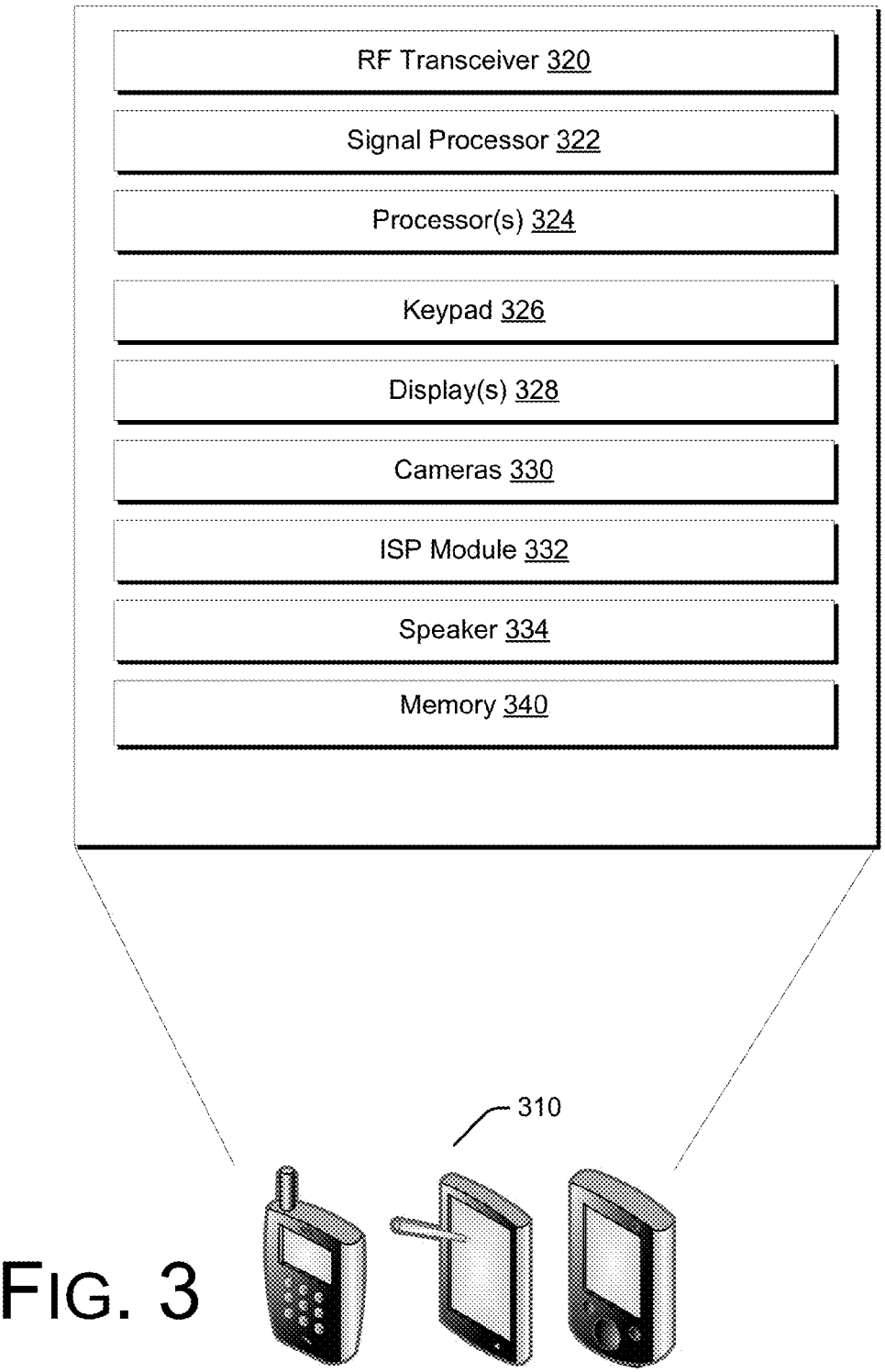

FIG. 3 is a schematic illustration of another embodiment of an electronic device 310 which may be adapted to include a backlight assembly as described herein, according to embodiments. In some embodiments electronic device 310 may be embodied as a mobile telephone, a personal digital assistant (PDA), a laptop computer, or the like. Electronic device 310 may include an RF transceiver 320 to transceive RF signals and a signal processing module 322 to process signals received by RF transceiver 320.

RF transceiver 320 may implement a local wireless connection via a protocol such as, e.g., Bluetooth or 802.11x. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11 G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Electronic device 310 may further include one or more processors 324 and a memory module 340. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. In some embodiments, processor 324 may be one or more processors in the family of Intel® PXA27x processors available from Intel® Corporation of Santa Clara, Calif. Alternatively, other CPUs may be used, such as Intel's Itanium®, XEON™, ATOM™, and Celeron® processors. Also, one or more processors from other manufactures may be utilized. Moreover, the processors may have a single or multi core design.

In some embodiments, memory module 340 includes random access memory (RAM); however, memory module 340 may be implemented using other memory types such as dynamic RAM (DRAM), synchronous DRAM (SDRAM), and the like. Memory 340 may comprise one or more applications which execute on the processor(s) 322.

Electronic device 310 may further include one or more input/output interfaces such as, e.g., a keypad 326 and one or more displays 328. In some embodiments electronic device 310 comprises one or more camera modules 330 and an image signal processor 332, and speakers 334.

In some embodiments two displays may be presented to the host device as two separate displays. By way of example, referring to FIG. 4A, in some embodiments the two displays may be embodied as touch screens. A first display 410 may comprise a touch screen controller and a second display 420 may comprise a second touch screen controller. In one mode of operation, referred to herein as a normal mode, the first display 410 and the second display 420 may be exposed to the host device's operating system as separate displays.

In some embodiments electronic devices allow only a single touch screen to be active. In order to implement a display with two touch screens the two screens are presented to the host device as a single display by combining the frame buffers. By way of example, referring to FIG. 4B, in some embodiments the first display 410 and the second display 420 are exposed to the host device's operating system as a single, combined display 430.

Figure 5:
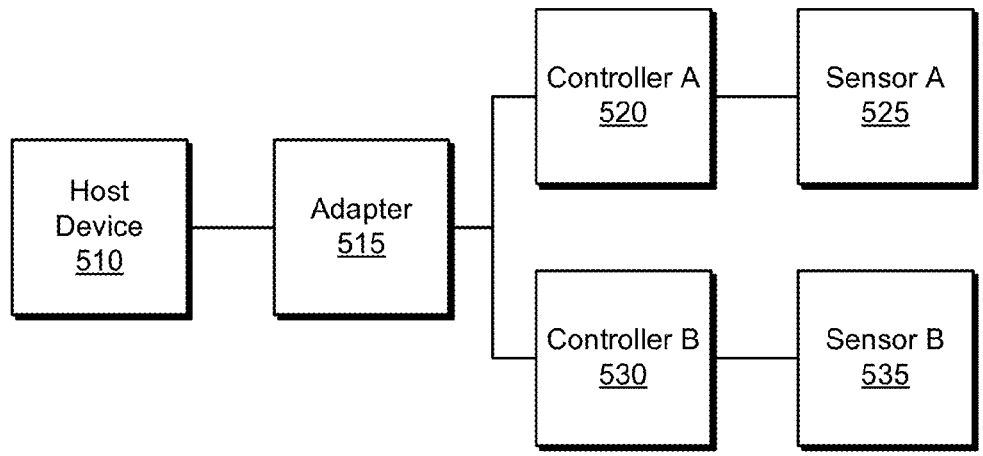

FIG. 5 is a schematic illustration of an architecture to implement a dual touch device. Referring to FIG. 5, a host device 515 is coupled to a touch adapter 515 by a suitable connection, e.g., a universal serial bus (USB) link. A first touch controller 520 is coupled to a first sensor 525, which may be embodied as a touch screen sensor. Similarly, a second controller 530 is coupled to a second sensor 535.

Figure 6:
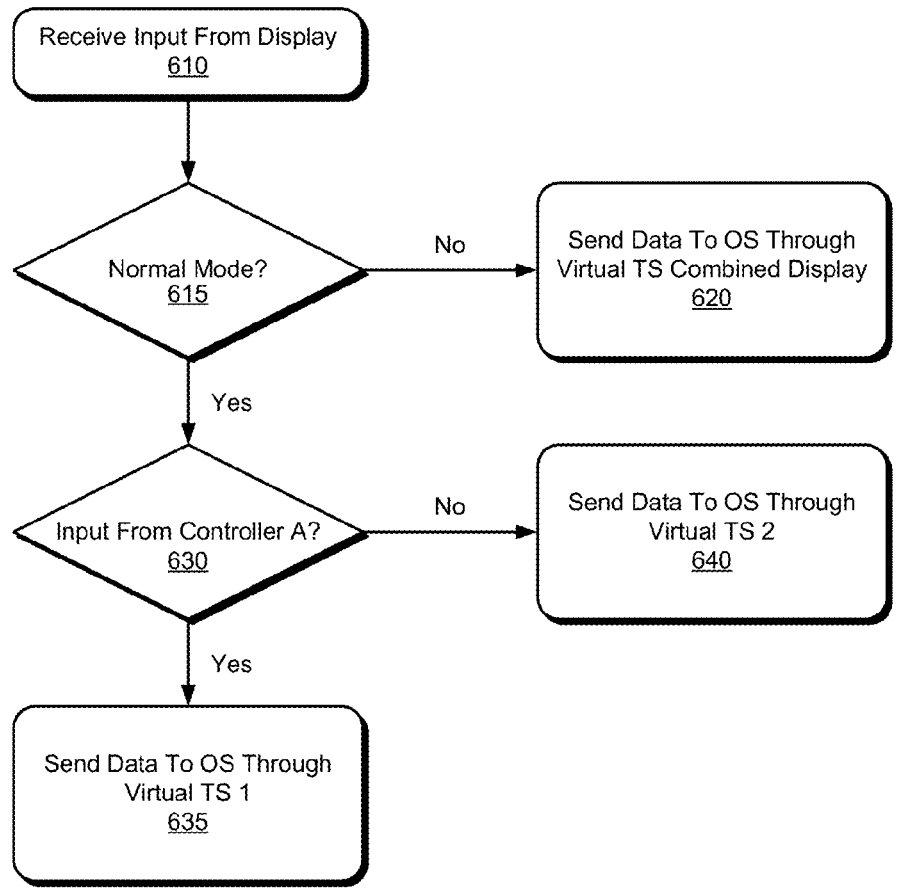
FIG. 6 is a flowchart illustrating operations in a method to manage displays for electronic devices in accordance with some embodiments.

FIG. 6 is a flowchart illustrating operations in a method to manage displays for electronic devices in accordance with some embodiments. Referring to FIG. 6, at operation 610 a touch screen driver receives input from a touch screen. If, at operation 615 the display is not operating in normal mode (i.e., if the display is operating in a combined mode) then control passes to operation 620 and the touch screen input data is sent to the operating system through the virtual touch screen combined display.

By contrast, if at operation 615 the display is operating in normal mode, then control passes to operation 630. If, at operation 630 the touch screen input is from controller A 520, then the touch screen data is sent to the operating system through virtual touch screen 1 (operation 635). By contrast, if at operation 630 the input did not come from controller A 520, then the touch screen data is sent to the operating system through virtual touch screen 2 (operation 640).

As described above, in some embodiments the display controller 110 is configured to present the second LCD panel 140 as an extension of the first LED panel 120. By way of example, if the first and second LCD panels have a resolution of 1920×1080 pixels, the display controller 110 is configured to present the LCD panels 120, 140 as an extended LCD panel having a resolution of 1920×2160, or 3940×1080 pixels. In such embodiments the display controller 110 implements a method to convert location coordinates associated with inputs to and outputs from the second LCD panel 140 from the actual coordinates on the second LCD panel to coordinates on the extended LCD panel. One skilled in the art will recognize that the LCD panels could have different resolutions, e.g., 2560×1400, or 3200×1600.

Figure 7A:
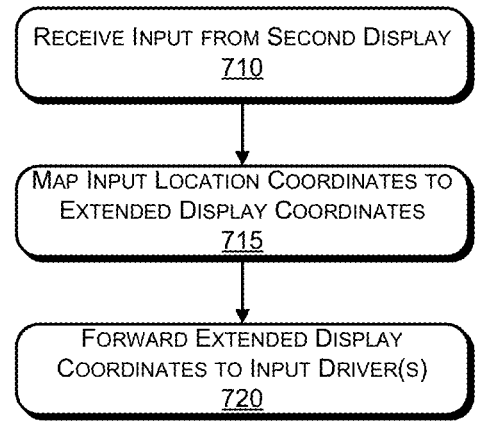
FIGS. 7A-7B are flowcharts illustrating operations in a method to convert location coordinates for a display in accordance with some embodiments.
Figure 7B:
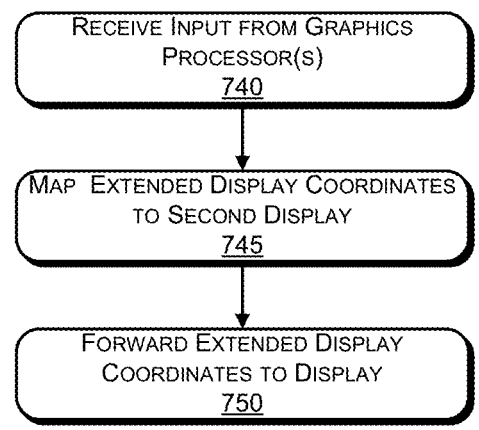

FIGS. 7A and 7B are flowcharts illustrating operations in a method to convert location coordinates for a display in accordance with some embodiments. In the embodiments depicted the operations depicted in the flowchart of FIGS. 7A-7B may be implemented by the display controller 110.

FIG. 7A is a flowchart illustrating operations in an exemplary input location conversion method. Referring first to FIG. 7A, at operation 710 the display controller 110 receives an input from the second LCD panel 140. By way of example, the input may originate from an input device such as a mouse, a keyboard, or the like, or from a touch on a touch screen. At operation 715 the display controller maps the input location coordinates from the second LCD panel 140 to coordinates on an extended panel. By way of illustration, in an embodiment in which two 1920×1080 displays are presented as a single extended display with a resolution of 1920×2160, the display controller may add 1080 to the row location coordinate on the second display to obtain the row location in the extended display. Because the displays are combined in a vertical fashion the column location coordinate remains the same. One skilled in the art will recognize that similar mapping conversions may be performed for LCD panels of different resolutions. At operation 720 the display controller forwards the converted location coordinates to one or more input drivers on the electronic device.

FIG. 7B is a flowchart illustrating operations in an exemplary output location coordinate conversion method. Referring to FIG. 7B, at operation 740 the display controller 110 receives an input from a graphics processor such as the graphics processor 224 depicted in FIG. 2. As described above, the display controller 110 presents the LCD panels 120, 140 as a single, extended display. Thus, the input from the graphics controller is mapped to the extended display. At operation 745 the display controller maps the location coordinates received from the graphics controller 224 to the second display. By way of illustration, in an embodiment in which two 1920×1080 displays are presented as a single extended display with a resolution of 1920×2160, the display controller may subtract 1080 from the row location coordinate on the extended display to obtain the row location in the second display. Again, because the displays are combined in a vertical fashion the column location coordinate remains the same. One skilled in the art will recognize that similar mapping conversions may be performed for LCD panels of different resolutions. At operation 750 the display controller forwards the converted location coordinates to the display.

Figure 8:
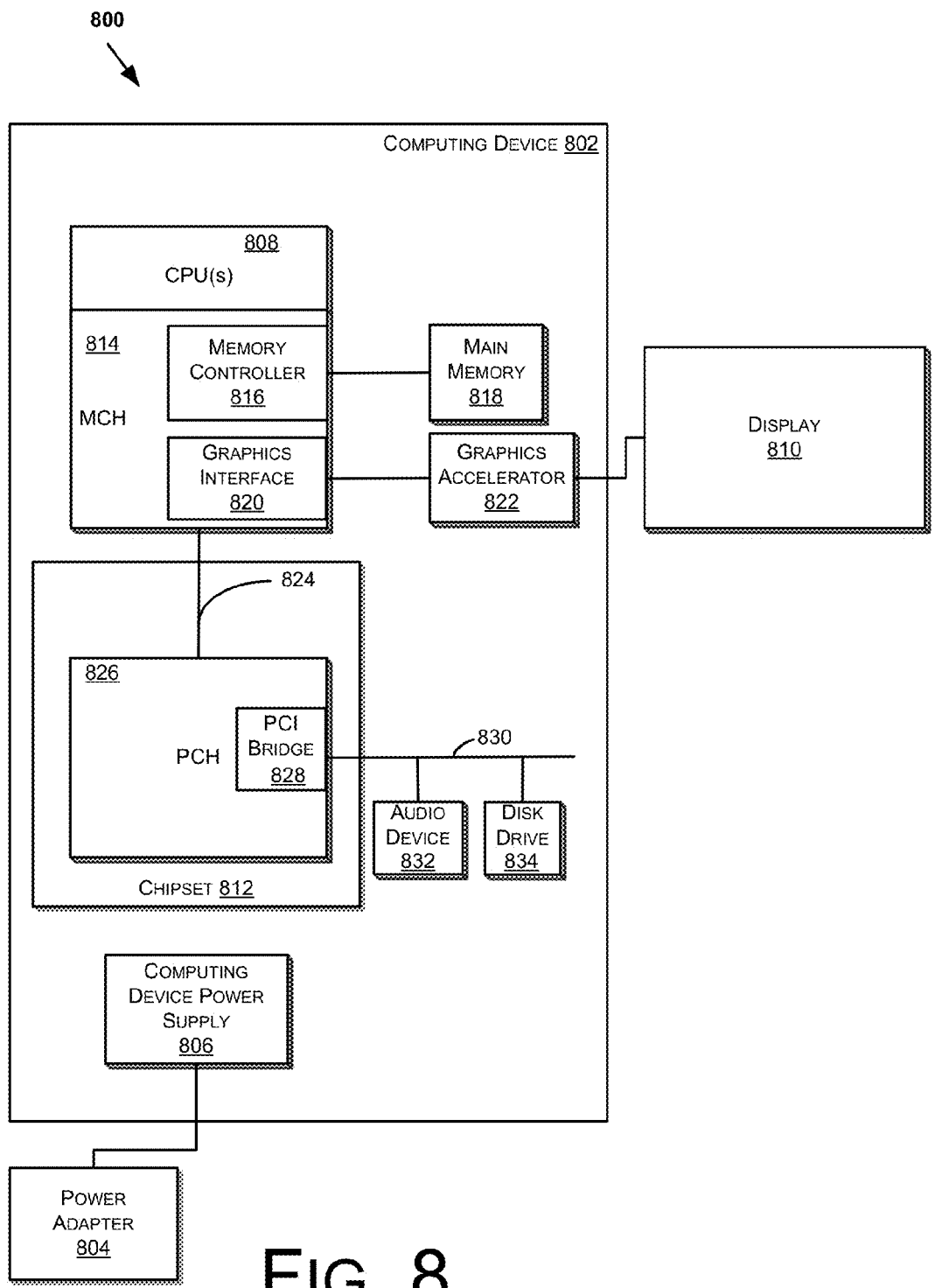
FIG. 8 is a schematic illustration of an electronic device which may be including displays in accordance with some embodiments.

As described above, in some embodiments the electronic device may be embodied as a computer system. FIG. 8 is a schematic illustration of a computer system 800 in accordance with some embodiments. The computer system 800 includes a computing device 802 and a power adapter 804 (e.g., to supply electrical power to the computing device 802). The computing device 802 may be any suitable computing device such as a laptop (or notebook) computer, a personal digital assistant, a desktop computing device (e.g., a workstation or a desktop computer), a rack-mounted computing device, and the like.

Electrical power may be provided to various components of the computing device 802 (e.g., through a computing device power supply 806) from one or more of the following sources: one or more battery packs, an alternating current (AC) outlet (e.g., through a transformer and/or adaptor such as a power adapter 804), automotive power supplies, airplane power supplies, and the like. In some embodiments, the power adapter 804 may transform the power supply source output (e.g., the AC outlet voltage of about 110 VAC to 240 VAC) to a direct current (DC) voltage ranging between about 7 VDC to 12.6 VDC. Accordingly, the power adapter 804 may be an AC/DC adapter.

The computing device 802 may also include one or more central processing unit(s) (CPUs) 808. In some embodiments, the CPU 808 may be one or more processors in the Pentium® family of processors including the Pentium® II processor family, Pentium® III processors, Pentium® IV, CORE2 Duo processors, or Atom processors available from Intel® Corporation of Santa Clara, Calif. Alternatively, other CPUs may be used, such as Intel's Itanium®, XEON™, and Celeron® processors. Also, one or more processors from other manufactures may be utilized. Moreover, the processors may have a single or multi core design.

A chipset 812 may be coupled to, or integrated with, CPU 808. The chipset 812 may include a memory control hub (MCH) 814. The MCH 814 may include a memory controller 816 that is coupled to a main system memory 818. The main system memory 818 stores data and sequences of instructions that are executed by the CPU 808, or any other device included in the system 800. In some embodiments, the main system memory 818 includes random access memory (RAM); however, the main system memory 818 may be implemented using other memory types such as dynamic RAM (DRAM), synchronous DRAM (SDRAM), and the like. Additional devices may also be coupled to the bus 810, such as multiple CPUs and/or multiple system memories.

The MCH 814 may also include a graphics interface 820 coupled to a graphics accelerator 822. In some embodiments, the graphics interface 820 is coupled to the graphics accelerator 822 via an accelerated graphics port (AGP). In some embodiments, a display (such as a flat panel display) 840 may be coupled to the graphics interface 820 through, for example, a signal converter that translates a digital representation of an image stored in a storage device such as video memory or system memory into display signals that are interpreted and displayed by the display. The display 840 signals produced by the display device may pass through various control devices before being interpreted by and subsequently displayed on the display.

A hub interface 824 couples the MCH 814 to an platform control hub (PCH) 826. The PCH 826 provides an interface to input/output (I/O) devices coupled to the computer system 800. The PCH 826 may be coupled to a peripheral component interconnect (PCI) bus. Hence, the PCH 826 includes a PCI bridge 828 that provides an interface to a PCI bus 830. The PCI bridge 828 provides a data path between the CPU 808 and peripheral devices. Additionally, other types of I/O interconnect topologies may be utilized such as the PCI Express™ architecture, available through Intel® Corporation of Santa Clara, Calif.

The PCI bus 830 may be coupled to an audio device 832 and one or more disk drive(s) 834. Other devices may be coupled to the PCI bus 830. In addition, the CPU 808 and the MCH 814 may be combined to form a single chip. Furthermore, the graphics accelerator 822 may be included within the MCH 814 in other embodiments.

Additionally, other peripherals coupled to the PCH 826 may include, in various embodiments, integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), and the like. Hence, the computing device 802 may include volatile and/or nonvolatile memory.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:
1. A display assembly, comprising:
a backlight assembly;
a first display panel proximate a first side of the backlight assembly, wherein the first display panel is to be communicatively coupled to a first touch screen controller to receive first touch screen input data from the first touch screen, the first display panel having a first resolution;
a second display panel proximate a second side of the backlight assembly, opposite the first side, wherein the second display panel is to be communicatively coupled to a second touch screen controller to receive second touch screen input data from the second touch screen, the second display panel having a second resolution; and
a display controller communicatively coupled to the first display panel and the second display panel, wherein the display controller comprises logic, at least partially including hardware logic, to:
manage first touch screen input data and second touch screen data separately when the display assembly is operating in a normal operating mode; and
in response to a determination that the display assembly is operating in a combined operation mode, to:
receive, in the display controller, touch screen data from the second display panel, wherein the touch screen data corresponds to location coordinates on the second display panel;

convert the touch screen data from the second display panel to an output corresponding to location coordinates on a virtual extended display, the virtual display panel having a third resolution corresponding to a combination of the first resolution and the second resolution; and forward the output corresponding to the location coordinates on the virtual extended display to an input driver.

2. The display assembly of claim 1, wherein the backlight assembly comprises:
a backlight panel;
a first light extraction layer proximate a first side of the backlight panel;
a first diffuser layer proximate the first light extraction layer;
a first light directing layer proximate the first diffuser layer;
a second light extraction layer proximate a second side of the backlight panel;
a second diffuser layer proximate the second light extraction layer; and
a second light directing layer proximate the second diffuser layer.

3. The display assembly of claim 1, wherein the display controller further comprises logic, at least partially including hardware logic, to:
receive, in the display controller, an output from a graphics processor, wherein the output corresponds to location coordinates on the virtual extended display;
convert the output corresponding to the location coordinates on the virtual extended display to data corresponding to location coordinates on the second display panel; and
forward the data corresponding to location coordinates to the second display panel.

4. The display assembly of claim 3, wherein:
the second display panel is to be communicatively coupled to the controller via a communication connection with the first display panel.

5. The display assembly of claim 3, wherein:
at least one of the first display panel or the second display panel comprises a liquid crystal panel.

6. The display assembly of claim 1, wherein:
the first display has a first resolution of M×N pixels;
the second display has a second resolution of M×N pixels; and
the extended display has a combined resolution of M×2N pixels.

7. The display assembly of claim 1, wherein:
the first display has a first resolution of 1920×1080 pixels;
the second display has a second resolution of 1920×1080 pixels; and
the extended display has a combined resolution of 1920×2160 pixels.

8. An electronic device, comprising:
an electronic component;
a backlight assembly;
a first display panel proximate a first side of the backlight assembly, wherein the first display panel is to be communicatively coupled to a first touch screen controller to receive first touch screen input data from the first touch screen, the first display panel having a first resolution;
a second display panel proximate a second side of the backlight assembly, opposite the first side, wherein the second display panel is to be communicatively coupled to a second touch screen controller to receive second touch screen input data from the second touch screen, the second display panel having a second resolution; and
a display controller communicatively coupled to the first display panel and the second display panel, wherein the display controller comprises logic, at least partially including hardware logic, to:
manage first touch screen input data and second touch screen data separately when the display assembly is operating in a normal operating mode; and
in response to a determination that the display assembly is operating in a combined operation mode, to:
receive, in the display controller, touch screen data from the second display panel, wherein the touch screen data corresponds to location coordinates on the second display panel;
convert the touch screen data from the second display panel to an output corresponding to location coordinates on a virtual extended display, the virtual display panel having a third resolution corresponding to a combination of the first resolution and the second resolution; and
forward the output corresponding to the location coordinates on the virtual extended display to an input driver.

9. The electronic device of claim 8, wherein the backlight assembly comprises:
a backlight panel;
a first light extraction layer proximate a first side of the backlight panel;
a first diffuser layer proximate the first light extraction layer;
a first light directing layer proximate the first diffuser layer;
a second light extraction layer proximate a second side of the backlight panel;
a second diffuser layer proximate the second light extraction layer; and
a second light directing layer proximate the second diffuser layer.

10. The electronic device of claim 8, wherein the display controller further comprises logic, at least partially including hardware logic, to:
receive, in the display controller, an output from a graphics processor, wherein the output corresponds to location coordinates on the virtual extended display;
convert the output corresponding to the location coordinates on the virtual extended display to data corresponding to location coordinates on the second display panel; and
forward the data corresponding to location coordinates to the second display panel.

11. The electronic device of claim 10, wherein:
the second display panel is to be communicatively coupled to the controller via a communication connection with the first display panel.

12. The electronic device of claim 10, wherein:
at least one of the first display panel or the second display panel comprises a liquid crystal panel.

13. The electronic device of claim 8, wherein:
the first display has a first resolution of M×N pixels;
the second display has a second resolution of M×N pixels; and
the extended display has a combined resolution of M×2N pixels.

14. The electronic device of claim 8, wherein:
the first display has a first resolution of 1920×1080 pixels;
the second display has a second resolution of 1920×1080 pixels; and the extended display has a combined resolution of 1920×2160 pixels.

15. A computer program product comprising logic instruction stored in a non-transitory computer readable medium which, when executed by a controller, configure the controller to perform operations comprising:
- receiving, in the controller, touch screen data from a first display having a first resolution, wherein the touch screen data corresponds to location coordinates on the first display;
- converting the touch screen data from the display to an output corresponding to location coordinates on a virtual extended display, the virtual display panel having a third resolution corresponding to a combination of the first resolution and a second resolution associated with a second display coupled to the first display; and
- forwarding the output corresponding to the location coordinates on the virtual extended display to an input driver.

16. The computer program product of claim 15, further comprising logic instruction stored in a non-transitory computer readable medium which, when executed by a controller, configure the controller to perform operations comprising:
- receiving, in the controller, an output from a graphics processor, wherein the output corresponds to location coordinates on the extended display;
- converting the output corresponding to the location coordinates on the extended display to data corresponding to location coordinates on the display; and
- forwarding the data corresponding to location coordinates to the display.

17. The computer program product of claim 16, wherein the display comprises:
- a backlight assembly;
- a first display panel proximate a first side of the backlight assembly, wherein the first liquid crystal panel is to be communicatively coupled to a controller; and
- a second display panel proximate a second side of the backlight assembly, opposite the first side, wherein the second display panel is to be communicatively coupled to the controller,
- wherein the second display panel is to be communicatively coupled to the controller via a communication connection with the first display panel.

18. A controller, comprising logic to:
- receive, in the controller, touch screen data from a first display having a first resolution, wherein the touch screen data corresponds to location coordinates on the first display;
- convert the touch screen data from the display to an output corresponding to location coordinates on a virtual extended display, the virtual display panel having a third resolution corresponding to a combination of the first resolution and a second resolution associated with a second display coupled to the first display; and
- forward the output corresponding to the location coordinates on the virtual extended display to an input driver.

19. The controller of claim 18, further comprising logic to:
- receive, in the controller, an output from a graphics processor, wherein the output corresponds to location coordinates on the extended display;
- convert the output corresponding to the location coordinates on the extended display to data corresponding to location coordinates on the display; and
- forward the data corresponding to location coordinates to the display.

20. The controller of claim 19, wherein the display comprises:
- a backlight assembly;
- a first display panel proximate a first side of the backlight assembly, wherein the first liquid crystal panel is to be communicatively coupled to a controller; and
- a second display panel proximate a second side of the backlight assembly, opposite the first side, wherein the second display panel is to be communicatively coupled to the controller,
- wherein the second display panel is to be communicatively coupled to the controller via a communication connection with the first display panel.

\* \* \* \* \*